United States Patent [19]

Reimers

[11] Patent Number: 5,036,395
[45] Date of Patent: Jul. 30, 1991

[54] VIDEO PRODUCTION FACILITY

[75] Inventor: Ulrich Reimers, Pinneberg, Fed. Rep. of Germany

[73] Assignee: BTS Broadcast Television Systems GmbH, Darmstadt, Fed. Rep. of Germany

[21] Appl. No.: 431,601

[22] Filed: Nov. 3, 1989

[30] Foreign Application Priority Data

Nov. 9, 1988 [DE] Fed. Rep. of Germany ....... 3838000

[51] Int. Cl.$^5$ ............................................ H04N 5/222
[52] U.S. Cl. ................................... 358/185; 358/181
[58] Field of Search ................. 358/181, 185, 22, 183, 358/93

[56] References Cited

U.S. PATENT DOCUMENTS

| | | | |
|---|---|---|---|
| 3,889,051 | 6/1975 | Legler | 358/185 |
| 3,894,177 | 7/1975 | Howell | 358/185 |
| 4,301,475 | 11/1981 | McCoy | 358/183 |
| 4,532,547 | 7/1985 | Bennett | 358/181 |

OTHER PUBLICATIONS

New "Flagships" for the NOS Outside Broadcast Fleet, Broadcast Tripodium (GB) (1981), vol. 1, pp. 20–26.
The Design of a Novel Colour Outside Broadcast Unit, by A. O. Moore, Commun. & Broadcast (GB), vol. 5, No. 1, (Jul. 1979), pp. 27–37.
The All-Digital Television Studio, by Frank Davidoff, SMPTE Journal, vol. 89, No. 6, pp. 445–449.
Digital Production Switchers—By J. Vallee et al., SMPTE Journal, Mar. 1986, pp. 295–300.
The World's First All-Digital Television Production by Michel Qudin, SMPTE Journal, Jan. 1987, pp. 11–15.

Primary Examiner—Tommy P. Chin
Attorney, Agent, or Firm—Frishauf, Holtz, Goodman & Woodward

[57] ABSTRACT

A video production facility has a switching matrix for video signals that serves both as the usual studio switching matrix for video signals interposed between video signal sources and video signal destinations and also provides the necessary switching for supplying signals to a mixer and for directing the outputs of the mixer to their destinations. The signals to be mixed are directed to the outputs of the switching system that are connected to the mixer inputs. The switching system is subdivided into a first switch matrix for standard composite television signals, a second switch matrix for analog component television signals and a third switching matrix for digital video signals. Coders and decoders are provided for interconnecting the first and second switching matricies and analog-to-digital and digital-to-analog converters for interconnecting the second and third. The mixer is operated on a digital basis, and a control unit control the operation of the mixer and of the rest of the switching system.

9 Claims, 1 Drawing Sheet

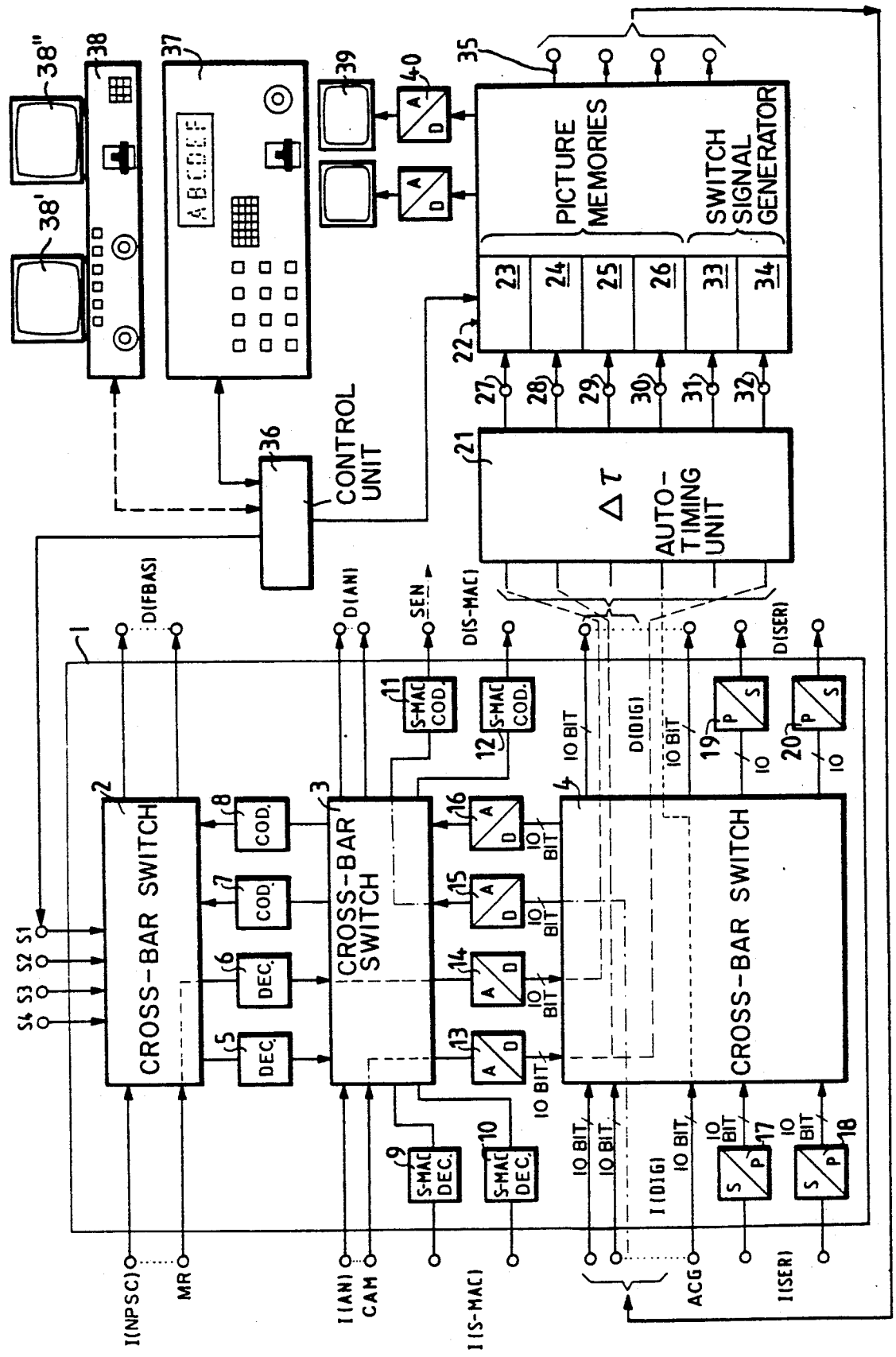

VIDEO PRODUCTION FACILITY

This invention concerns a production facility for various kinds of video productions, such as entertainment programs, commercials, educational programs, and so on, including the provision of special effects, mixing and blending of scenes, especially for transitions between scenes, resulting in a video production has all the benefits of modern editing.

Mixers have been particularly important in the production of video tap records and/or direct broadcasts. Such mixers serve to combine together video signals from different sources according to the particular requirements of the production. Such mixers work with input switching systems of the kind generally referred to as cross-bar or cross-point switches, by which a few of the available input signals can be supplied to various processing steps. For example in the use of the blue-wall method, the respective signals of a foreground camera and of a switch signal generator are supplied to one input of a fading mixer and a video signal obtained from a source of background signal is supplied to another input of the mixer. In addition, when certain legends are to be inserted in the output signal of the mixer, an alphanumeric character generator is connected with a legend fader through the input crossbar switch.

Even in small studio complexes not all of the picture signal sources are continuously connected with the inputs of the input crossbar switch of a mixer. On one hand, the number of picture signal sources is often considerably larger than the number of inputs of the mixer. On the other hand, the same picture signal sources are used successively for different purposes, so that in general no permanent assignments of picture signal sources to mixer inputs are provided. In video production studios, there is also generally provided a studio switching system for switching a multiplicity of video signals. All available video signal sources are usually connected to this studio switching system. The outputs of the studio switching system, commonly referred to as studio crossbars although in fact semi-conductor row and column switches can be used instead of mechanical crossbar switches, are connected to different equipments receiving video signals for various purposes, such as, for example, video recording equipment, cable video transmission equipment and radio broadcast video transmitting equipment.

In the herefore known video production facilities, further outputs of the studio crossbars are connected with inputs of one or more input crossbars of one or more mixer switches. These known video production facilities are accordingly very expensive.

SUMMARY OF THE INVENTION

It is an object of the present invention to reduce the technical expense and complication of a complete video production facility and at the same time to preserve a high degree of flexibility in the cooperation of equipments connected to the video production facility.

Briefly, a single switching system of the general type heretofore referred to as the crosspoint or crossbar type, which may also be referred to as a row and column matrix switching system, but is generally referred to here simply as a switching system, is used with a versatile mixer, in a manner in which video signals are passed through the switching system either directly to the ultimate studio destinations or to the mixer and then the mixer outputs are looped back to the input side of the same switching system for switching to the studio destination.

The video production facility of the invention has the advantage that the equipment expense is reduced. In particular, no separate input crossbar switch is needed for the mixer.

For use in studios in which signals are available in different stages and states of coding, it is desirable for the video production facility of the invention to have a switching system that is subdivided into three parts, each functioning as a so-called crossbar switch, one for use with standard composite analog television signals, another for handling simple analog component video signals and a third for digital video signals. In this case it is advantageous to provide encoders and decoders between the first and second parts of the switching system and analog-to-digital and digital-to-analog converters between the second and third parts. It is also advantageous in such a case for the mixer to operate on a digital basis. This makes it unnecessary to provide encoders, decoders and converters in association with the mixer circuit between the mixer circuit and the switching system. The digital part of the switching system can also be provided with input serial-to-parallel converters and output parallel-to-serial converters respectively for some of its inputs and for some of its outputs.

BRIEF DESCRIPTION OF THE DRAWING

The invention is further described by way of illustrative example with reference to the annexed drawing, the single figure of which is a circuit block diagram of a video production facility in accordance with the invention.

DESCRIPTION OF THE ILLUSTRATED EMBODIMENT

A studio switching system of the kind generally referred to as a studio crossbar switching matrix is shown at 1 in the drawing. It is subdivided into three parts 2, 3 and 4 which are hereafter referred to as simply as the first, second and third crossbar switches, although it will be understood that they may be row and column switching matrices of any type. The crossbar switch 2 serves for distribution, from input to output, of standard composite television signals, for example NTSC signals, and has inputs I(NTSC) to which signal sources delivering standard composite video signals may be connected. This crossbar switch 2 also has outputs 0(NTSC). It also has two additional outputs respectively connected to the inputs of decoders 5 and 6 and two additional inputs respectively connected to the outputs of encoders 7 and 8.

The second crossbar switch 3 is for sets of simple analog television component signals, for example for signal triplets Y, $P_B$ and $P_R$ respectively for luminance and the usual color difference pairs, which are suitable for being encoded by one of the encoders 7 and 8 to produce a standard composite television signal. The crossbar switch 3 has inputs I(AN) and outputs 0(AN) for such sets of simple analog television component signals. It also has additional inputs and outputs respectively connected to the above-mentioned decoders and encoders. It has another set of additional inputs and outputs respectively for decoders 9, 10 and encoders 11, 12 for time multiplex analog component signals for which the studio switching system 1 also has the inputs I(S-MAC) and outputs O(S-MAC).

The third crossbar switch serves for distribution of parallel digital signals comforming with the CCIR 601 standard. Interconnections between the second crossbar switch 3 and the third crossbar switch 4 are provided through the analog to digital converters 13, 14 in one direction and through the digital to analog converters 15, 16 in the other direction. Similarly to the other crossbar switches 2 and 3, the crossbar switch 4 has a row of inputs I(DIG) and a row of outputs 0(DIG). In addition, serial digital signals can be supplied to the crossbar switch 4 through inputs I(SER) and serial to parallel converters 17, 18. Parallel to serial converters 19 and 20 are provided for making serial digital signals available at outputs 0(SER) of the switching system 1.

A portion of the digital outputs 0(DIG) of the third crossbar switch 4 is connected through a so-called auto-timing unit 21 to a mixer 22. The mixer is combined with apparatus for generating digital video effects in a known way that does not need to be further described here. Picture memories 23, 24, 25 and 26 are provided within the mixer 22. they are respectively connected to inputs 27, 28, 29 and 30, whereas the inputs 31 and 32 provide video signal inputs to the switching signal generators 33 and 34, which likewise operate in a known way that does not need to be further described here. The outputs 35 of the mixer 22 are connected with a portion of the inputs I(DIG) of the crossbar switch 4. Other picture signal generators and picture signal sources can be connected to the other inputs of the crossbar switch 4.

A control unit 36 is provided for the mixer 22 and the switching control inputs S1, S2, S3 and S4 of the studio switching system 1. The control unit 36 is connected to a command unit 37 by which commands for mixing and for corresponding control of the studio switching system 1 can be entered into the system and at which the contemporary state of the mixer and of the related circuits of the studio switch system 1 can be displayed. Alternatively the control unit 36 can also be controlled from an additional command unit 38, shown in the drawing to be equipped with monitors 38' and 38''.

The studio switching system 1 also has additional control inputs for features not shown in the drawing, controlled by control means and command means not particularly shown, whereby video signals can be switched through that do not require any mixing. In other words, the studio switching system 1 is a complete studio switching system into which, according to the invention, all the necessary switching of the inputs and outputs of the mixer 22 has been incorporated.

The manner of operation of the video production facility illustrated in the drawing will now be explained by way of example. For this purpose it should be assumed that the camera CAM is connected to one of the analog component video signal inputs I(AN), the camera being directed at a speaker. A background signal is being played out from a magnetic recording equipment MR and is being supplied over one of the standard composite television signal inputs I(NTSC). As shown in the broken lines in the drawing, these signals reach inputs of the mixer 22. To get them there the necessary crosspoints of the studio switching system 1 are connected by the command unit 37 acting through the control unit 36. At the same time the signal of the camera is supplied both to an input 28 that represents the input of a fader and to an additional input 31 that belongs to a switching signal generator 33 for inserting the camera signal in the background signal. The mixed signal that is produced, which contains the foreground and background signals is then brought through one of the outputs 35 of the mixer 22 and one of the inputs I(DIG) of the third crossbar switch 4. It proceeds from the third crossbar switch 4 through a digital to analog converter 15 to the second crossbar switch 3 and from there through an S-MAC coder 11 to a broadcasting transmitter input BC. The path of the mixed signal is shown by chain-dotted lines in the drawing.

If writing is to be shown also in the signal just described, an input ACG connected with an alphanumeric character generator is activated by a corresponding keyboard of the command unit 37. It is assumed that legends were entered by keyboard in advance and stored, for release at the proper time, in the character generator. The third crossbar switch 4 feeds the legend signal to another input 30 of the mixer and a control signal is provided to the mixer 22 which produces insertion of the signals generated by the character generator ACG.

Monitors 39 are provided for the mixer 22 and, as in the case of the known video production facilities, these monitors can be used to display a contemporary output signal, a preview signal and the individual input signals. In the production facility according to the invention, however, the monitors 39 can also be supplied with these desired signals over the studio switching system 1. The monitors may for that purpose be connected to certain outputs O(NTSC) or O(AN) of the studio switching system, with the latter being correspondingly controlled through the control unit 36. However, in view of the objective of effective use of the studio switching system 1 and the objective of reducing the number and length of cabling connections, it will be found more economical and simple, in a further extension of the spirit of the invention, for the monitors 39 to be directly connected to the mixer 22 through additional digital-to-analog converters 40, as shown in the drawing.

The auto-timing unit 21 which is interposed between a portion of the digital outputs 0(DIG) of the third crossbar switch 4 and the inputs of the mixer 22 is an automatic phasing system that automatically phase locks all signals to be processed by the mixer, having a phase correction range of 7 microseconds. It could be expected that the serial-to-parallel converters 17 and 18 and the analog-to-digital converters 13, 14, 15 and 16 would all be timed by a local clock (not shown) and, so far as necessary, also by a horizontal synchronizing reference signal (not shown), but the other input signals of the third crossbar switch 4 may come from an image source or a previous phase processing device, such as a digital memory or color corrector, not yet clocked by the local clock or not already synchronized to the horizontal reference signal. Furthermore the design of the cross-bar switch 4 may introduce some short delays that would require retiming. Such an automatic phasing system is well known, one of them having been incorporated in the digital mixer TTV 5640 included in the all-digital studio installed in Rennes, France described by J. Vallee, M. Artigalas and M. Favreau in "Digital Production Switchers" SMPTE J., Vol. 95, pgs. 295–300 (March 1986) and referred to in SMPTE J., Vol. 26, pg. 11, (January 1987).

Although the invention has been described with reference to a particular illustrative embodiment, it will be understood that modifications and variations are possible within the inventive concept.

I claim:

1. A video apparatus production facility comprising a switching system having video signal inputs, video signal outputs and switching control inputs, a mixer for video signals having video signal inputs, video signal outputs and at least one control input, inputs of a first set of said video signal inputs of said switching system being respectively connectable to sources of video signals and outputs of a first set of said video signal outputs of said switching system being connectable to respective equipments for displaying, transmitting, storing or otherwise utilizing video production signals, and wherein:

outputs of a second set of said of video signal outputs of said switching system (1) are connected to respective video signal inputs of said mixer (22) and inputs of a second set of said video signal inputs of said switching system (1) are connected to respective outputs of a first set of video signal outputs of said mixer (22), and.

a control unit (36) is provided for supply of mixer control signals to said at least one control input of said mixer (22) and of switching control signals to said control inputs of said switching system in such a manner that inputs for video signals which are to be mixed are connected to outputs of said second set of video signal outputs of said switching system and every video signal resulting from mixing is connected from an output of said mixer to an input of said second set of inputs of said switching system.

2. The video production facility of claim 1, wherein automatically adjustable delay means (21) are interposed in said respective connections between outputs of said second set of video signal outputs of said switching system and said video signal inputs of said mixer, said delay means being automatically controlled for having a common time reference at said video signal inputs of said mixer (22).

3. The video production facility of claim 1, wherein said switching system (1) is subdivided into a plurality of parts (2,3,4) each for switching video signals having a different kind of coding.

4. The video production facility of claim 3, wherein the parts into which said switching system (1) is subdivided are a first part (2) for standard composite analog television signals, a second part (3) for sets of simple analog component television signals, and a third part (4) for digital television signals, and wherein color television encoders (7, 8) are interposed between said second and said first parts of said switching system for converting sets of simple analog component television signals into standard composite analog television signals, color television decoders (5, 6) are connected between said first and second parts of said television switching system for converting standard composite analog television signals into sets of simple analog component television signals, digital to analog converters (15, 16) are provided and connected between said third and second parts of said switching system for converting digital television signals into simple analog component television signals and analog to digital converters (13, 14) are provided and connected between said second and third parts of said switching system for converting simple analog component television signals into digital television signals.

5. The video production facility of claim 4, wherein said mixer (22) is implemented in digital television technology and said second set of outputs of said switching system which are connected with said inputs of said mixer are connected to said third part of said switching system.

6. The video production facility of claim 5, wherein said third part (4) of said switching system has serial to parallel converters (17, 18) connected to respective inputs of a portion of said first set of video signal inputs of said switching system and corresponding inputs of said third part (4) of said switching system and has parallel-to-serial converters (19, 20) connected between outputs of said third part (4) of said switching system and a portion of said outputs of said first set outputs of said switching system.

7. The video production facility of claim 4, wherein television decoders (9, 10) and television encoders (11, 12) is connected for handling time multiplex video signals are provided respectively at some inputs and at some outputs of said second part (3) of said switching system (1).

8. The video production facility of claim 5, wherein monitors (39) are provided for display of respective video signals generated in said mixer (22 and digital to analog converters (40) are respectively connected between outputs of a second set of outputs of said mixer (22) and said monitors.

9. The video production facility of claim 1, wherein a system for generating digital video effects is built into said mixer (22).

* * * * *